United States Patent [19]

DiCiurcio

[11] 4,145,743
[45] Mar. 20, 1979

[54] VOLTAGE LEVEL GENERATOR USING DIGITAL INTEGRATION

[75] Inventor: John A. DiCiurcio, Cherry Hill, N.J.

[73] Assignee: RCA Corporation, New York, N.Y.

[21] Appl. No.: 754,687

[22] Filed: Dec. 27, 1976

[51] Int. Cl.² ..................... G06F 15/32; G06J 1/00
[52] U.S. Cl. ............................. 364/605; 307/359; 343/7 A; 364/733
[58] Field of Search ............... 307/359, 362; 328/117, 328/127, 128; 343/7 A; 364/733, 605

[56] References Cited

U.S. PATENT DOCUMENTS

| | | | |
|---|---|---|---|
| 3,374,479 | 3/1968 | Moore | 343/7 A |
| 3,422,435 | 1/1969 | Cragon et al. | 235/150.51 |
| 3,430,235 | 2/1969 | Bender et al. | 343/7 A |
| 3,505,637 | 4/1970 | Abruzzo | 343/7 A |
| 3,550,018 | 12/1970 | James et al. | 235/150.51 |
| 3,737,790 | 6/1973 | Brown | 307/359 |
| 3,916,179 | 10/1975 | Cuzzo | 235/183 |
| 3,959,641 | 5/1976 | Miller, Jr. et al. | 235/150.53 |
| 3,975,954 | 8/1976 | Barnich | 364/733 |
| 3,978,348 | 8/1976 | Henninger et al. | 235/183 |
| 4,023,019 | 5/1977 | Leibowitz et al. | 235/150.51 |
| 4,062,012 | 12/1977 | Colbert et al. | 343/7 A |

Primary Examiner—Felix D. Gruber
Attorney, Agent, or Firm—H. Christoffersen; Samuel Cohen; Donald W. Phillion

[57] ABSTRACT

Circuit for producing an output threshold voltage having a given relation to noise signals. The threshold crossings of a noise signal and a reference signal are processed by a circuit including a digital integrator to produce the threshold voltage level that maintains a constant rate of noise threshold crossings.

3 Claims, 3 Drawing Figures

VOLTAGE LEVEL GENERATOR USING DIGITAL INTEGRATION

This invention relates to automatic bias circuits, that is, to circuits for producing a controllable threshold voltage level.

Noise can create problems in data communications, radar, broadcast, and other systems used in the transmission of information. Automatic gain control is an indirect way of reducing noise effects in radar, television, and radio applications. In addition, radio and television receivers often use noise inverters and noise cancelling circuits to reduce the level of maximum noise with relation to the desired signal. Some communication circuits use a technique called "signal above noise" which requires a noise threshold value which serves as the baseline for the information signals. An example of a circuit employing a noise threshold is a CFAR (Constant False Alarm Rate) circuit in radar. Another is a circuit for the transmission of information on noisy lines such as voice quality telephone lines.

A circuit embodying the invention produces an output voltage level having a value related to a noise signal and includes comparator means responsive to the output voltage level and to the noise signals for producing an input digital pulse train representing the noise signal values which exceed the output voltage level. The circuit also includes means for generating a reference digital pulse train and integrator means responsive to the input and the reference pulse trains for producing a digital signal having a value proportional to the accumulated difference of the pulse trains with respect to time. The output voltage level is produced by a means responsive to the integrator means.

Figure 1:
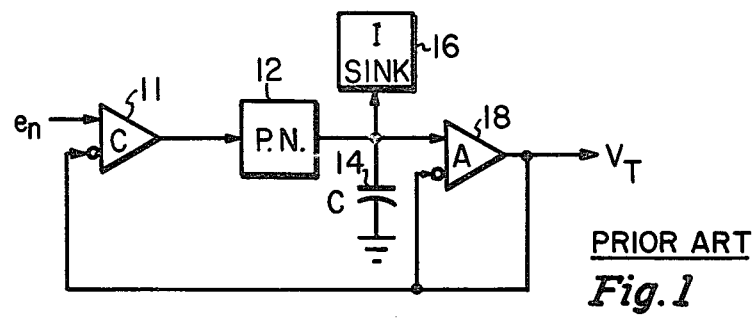
FIG. 1 is a block diagram of a prior art circuit for producing a threshold voltage.

In FIG. 1, a comparator 11 compares the magnitude of a noise voltage ($e_n$) to a threshold voltage ($V_T$) to produce a train of pulses related to the noise peaks which exceed the threshold voltage. A pulse normalizer 12, which can be a one-shot multivibrator, produces output pulses of fixed duration in response to the pulses produced by the comparator 11. The output pulses from the pulse normalizer 12 deposit a charge on a capacitor 14. A current sink 16 maintains a constant current drain from the pulse normalizer and the capacitor 14. At some pulse rate of the output signals from the pulse normalizer 12, the charge deposited on the capacitor 14 will be drawn off by the current sink 16 at a rate equal to the depositing rate, thereby maintaining a constant voltage across the capacitor 14. An operational amplifier 18, having a very high input impedance, is used to sense the voltage across the capacitor 14. The output signal from the amplifier 18, which is the threshold level ($V_T$), is returned to the inverting input of the amplifier 18 so that the output voltage ($V_T$) is equal to the voltage at the non-inverting input, i.e., the output voltage from the amplifier 18 is the voltage across the capacitor 14. The unity gain amplifier 18 must have a very high input impedance to minimize its loading effect on the capacitor 14.

If the noise voltage, $e_n$ increases, the number of output pulses from the comparator 11 in a given interval of time will increase, thereby increasing the number of pulses from the pulse normalizer 12. This in turn will increase the rate at which a charge is deposited across the capacitor 14 compared to the rate at which the charge is removed by the current sink 16. The effect is to increase the voltage across the capacitor 14 which in turn raises the threshold voltage at the output of the amplifier 18 that is fed back to the comparator 11 to decrease the pulse rate from its output terminal. The threshold voltage ($V_T$) will therefore adjust itself so that the rate of threshold crossings, i.e., the number of noise pulses in a period of time that exceed the threshold level, remains constant.

The accuracy of the system shown in FIG. 1 depends upon the accuracy of the current sink 16, the amount of current leakage through capacitor 14 (leakage should be very low) and the quality of operational amplifier 18 (it should have a very high input impedance, for example). To modify the current sink 16 to draw more or less charge from the capacitor 14 in a given period of time requires complex circuitry and, when there are several modes of operation, many adjustments. It is therefore difficult to make the prior art circuit of FIG. 1 stable and the adjustments must be checked periodically.

Figure 2:
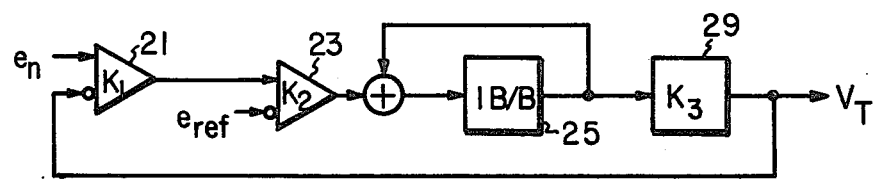
FIG. 2 is a representation of the circuit of the invention for analysis purposes.

In the analytical representation of a circuit embodying the invention shown in FIG. 2, the threshold voltage is compared to the noise voltage by a comparator 21. A device 23 together with a counter 25 comprise a digital integrator which maintains a count value that is increased by the pulse train from the comparator 21 and decreased by a pulse train from a reference source. The count value is converted to an analog voltage ($V_T$) by a digital-to-analog converter 29.

The parameter that is used to keep the noise crossing rate constant can be expressed as $$V_T/\psi_0^{\frac{1}{2}} = k,$$

where $V_T$ is the desired threshold voltage, $\psi_0^{\frac{1}{2}}$ is the root-mean-square (r.m.s.) noise voltage, and k is a constant.

The sensitivity — ratio of the effect to cause — of the comparator 21 is given by $$K_1 = B_v(V_T\psi_0^{-\frac{1}{2}})(\psi_0^{-\frac{1}{2}})\exp(-\frac{1}{2}V_T^2/\psi_0)\text{pps}/V. \quad (1)$$

The value of $B_v$ is the video bandwidth of input noise. The exponential term results from the Rayleigh distribution of noise. The units in which $K_1$ is measured are pulses per second per volt (pps/V).

The sensitivity of the digital integrator $K_2$, which includes the counter, is simply $$K_2 = (1/N)\text{counts/sec/pps}. \quad (2)$$

where N = maximum count value (count down ratio) of counter. The value of $K_2$ represents the average slope of the output signal from the counter averaged over a period of time. If each step increment is 1/N, then for a 1 pps input signal, $$\text{slope} = (n/N\text{counts}/n \text{ sec})/\text{pps} = (1/N)\text{cts/sec/pps}. \quad (3)$$

Letting $C_{out}(t)$ represents the count value at any time t, then $$C_{out}(t) = \sum_t (pps(t)/N)\Delta t \qquad (4)$$

As the input frequency increases, $\Delta t$ decreases toward zero and the input signal becomes a continuous function. Therefore, equation (4) becomes in the limit, $$C_{out}(t) = (1/N)\int_0^t pps(t)dt. \qquad (5)$$

In the complex domain, by La Place transformation, equation (5) is $$C_{out}(s) = (1/n)\frac{pps(s)}{s}$$

or $$C_{out}(s)/pps(s) = 1/Ns. \qquad (6)$$

Since $$K_2/s = C_{out}(s)/pp(s),$$

then $$K_2 = 1/N \text{ cts/sec/pps}. \qquad (7)$$

The sensitivity $K_3$ is simply $$K_3 = kV/\text{count} \qquad (8)$$

where k is the digital-to-analog scaling constant, determined by the reference voltages used in the digital-to-analog converter (DAC). The value of k will be assumed to be one in the remainder of the analysis.

The circuit transfer function is $$H(s) = K_1 K_2 K_3/s. \qquad (9)$$

From the transfer function, the various parameters of a system can be derived. For example, in a radar CFAR loop circuit, the best noise gate duration for a given pulse width and pulse repetition frequency (PRF) can be calculated.

Figure 3:
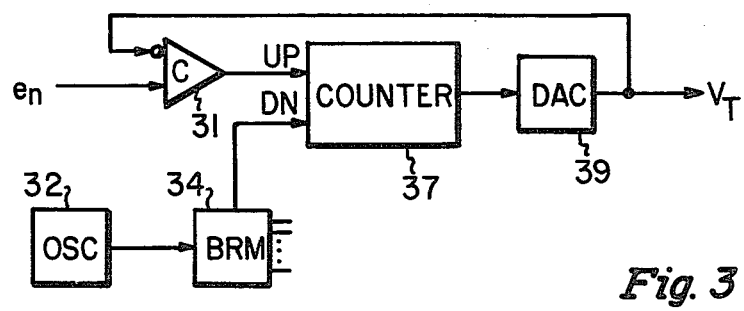
FIG. 3 is a block diagram of a circuit embodying the invention.

The logic diagram of FIG. 3 shows an embodiment of the invention implemented with devices which individually are known. A digital comparator 31 can be a high gain operational amplifier with no feedback. An up/down counter 37 comprises the digital integrator. Such up/down counters are commercially available or can be constructed from discrete devices; see, for example, "Up/Down Counter Designs", M. Walker, *Electronic Design* 12, (June 6, 1968). The digital output signal from the counter 37 is converted into an analog voltage by a digital-to-analog converter (DAC) 39. The reference input pulse train is supplied by an oscillator 32 through a binary rate multiplier (BRM) 34. Binary rate multipliers are well known in the art and provide the capability of varying the reference pulse train rate from the oscillator 22.

In operation, the counter 37 is incremented whenever the noise voltage exceeds the threshold voltage to produce a pulse at the output terminal of the comparator 31. The counter 37 is decremented by each pulse from the reference signal from the oscillator 32 via the binary rate multiplier 34. The count value in the counter 37 produces the digital equivalent of the threshold voltage and is converted to an analog signal by the DAC 39. When the noise signal increases, the counter value is incremented at a faster rate than it is decremented (by the reference signal), thereby increasing the threshold voltage. The latter is fed back to decrease the output pulse rate from the comparator 31. If the noise voltage decreases, the reference voltage decrements the counter value 37 faster than it is incremented by the output signal from the comparator 31. This reduces the threshold voltage so that the pulse rates from the comparator increases. Thus, the counter value tends to stabilize and the threshold voltage maintains a constant relation to the noise voltage.

The use of the binary rate multiplier 34 permits a reference signal rate to be selected according to a desired relation of the threshold voltage to the noise voltage. The reference signal rate can be adjusted by a binary signal applied to the rate multiplier 34 via the multiple input leads to the multiplier.

What is claimed is:

1. A circuit for producing an output voltage level having a value related to a noise signal comprising, in combination:

comparator means responsive to the output voltage level and the noise signal for producing a resultant digital pulse train representing the noise signal values which exceed the output voltage level;

means for generating a reference digital pulse train;

digitally integrating counting means responsive to said resultant and said reference pulse trains supplied thereto for producing a continuously updated digital signal having an instantaneous value proportional to the accumulated difference between the rates of said pulse trains with respect to time; and means responsive to said digital signal to produce said output voltage level with a magnitude proportional to the digital signal.

2. The invention as claimed in claim 1 wherein said digitally integrating counting means includes up/down counter means for producing said digital signals, said counter means including a first input terminal to which pulses to be counted in one sense may be applied and a second input terminal to which pulses to be counted in the opposite sense may be applied, said resultant pulse train being applied to said first input terminal and said reference pulse train being applied to said second input terminal.

3. The invention as claimed in claim 2 wherein said output voltage level producing means includes digital-to-analog converter means.

* * * * *

UNITED STATES PATENT AND TRADEMARK OFFICE
CERTIFICATE OF CORRECTION

PATENT NO. : 4,145,743
DATED : March 20, 1979
INVENTOR(S) : John Anthony DiCiurcio It is certified that error appears in the above—identified patent and that said Letters Patent is hereby corrected as shown below:

Column 4, line 2, "22" should read -- 32 --.

Signed and Sealed this

Seventeenth Day of June 1980

[SEAL]

Attest:

SIDNEY A. DIAMOND

Attesting Officer     Commissioner of Patents and Trademarks